US005674043A

United States Patent [19]

Dorn

[11] Patent Number: 5,674,043

[45] Date of Patent: Oct. 7, 1997

[54] RETRACTABLE WHEELCHAIR LIFT MECHANISM FOR STORAGE COMPARTMENT OF A COMMERCIAL VEHICLE

[75] Inventor: Russell J. Dorn, Aurora, Colo.

[73] Assignee: Stewart & Stevenson Power, Inc., Commerce City, Colo.

[21] Appl. No.: 560,293

[22] Filed: Nov. 17, 1995

Related U.S. Application Data

[63] Continuation-in-part of Ser. No. 335,501, Nov. 7, 1994.

[51] Int. Cl.$^{6}$ .......... B60P 1/44

[52] U.S. Cl. .......... 414/541; 414/921; 414/631; 414/542; 414/663; 187/222; 254/122

[58] Field of Search .......... 414/633, 541, 414/921, 543, 917, 542, 539, 462, 540, 544, 630, 549, 628, 629, 631, 662, 663; 187/222, 226; 254/122, 4 R, 4 C

[56] References Cited

U.S. PATENT DOCUMENTS

| | | | |
|---|---|---|---|
| 3,445,019 | 5/1969 | Steinert | 414/633 |
| 4,022,337 | 5/1977 | Eichenhofer et al. . | |
| 4,081,091 | 3/1978 | Thorley . | |
| 4,083,429 | 4/1978 | Abott | 414/541 |
| 4,164,292 | 8/1979 | Karkaw | 414/545 |
| 4,180,366 | 12/1979 | Roth et al. | 414/540 |
| 4,556,128 | 12/1985 | Thorley et al. . | |
| 4,685,858 | 8/1987 | Manning et al. | 414/537 |
| 4,958,979 | 9/1990 | Svensson | 414/549 |
| 5,149,246 | 9/1992 | Dorn | 414/541 |
| 5,158,419 | 10/1992 | Kempf et al. | 414/921 X |
| 5,224,723 | 7/1993 | Hatas | 414/541 |
| 5,316,432 | 5/1994 | Smalley et al. | 414/540 |
| 5,375,962 | 12/1994 | Kempf | 414/541 |

FOREIGN PATENT DOCUMENTS

| | | | |
|---|---|---|---|
| 444386 | 9/1991 | European Pat. Off. | 414/541 |
| 2516460 | 5/1983 | France | 414/921 |
| 2617754 | 4/1976 | Germany | 414/542 |

*Primary Examiner*—Frank E. Werner
*Attorney, Agent, or Firm*—John E. Reilly

[57] ABSTRACT

A wheel chair lift mechanism which can be installed in a storage compartment of a commercial vehicle to assist mobility-impaired persons in their ingress and egress to and from such vehicles is made up of a retractable control mechanism between fixed and movable frames within the storage compartment for selectively advancing a platform assembly between a retracted position within the storage compartment and an extended position outside of the compartment, and a lift mechanism for lifting and lowering the platform assembly between a ground level position, raised position aligned with the doorway and a stowed position aligned with the storage compartment.

20 Claims, 7 Drawing Sheets

RETRACTABLE WHEELCHAIR LIFT MECHANISM FOR STORAGE COMPARTMENT OF A COMMERCIAL VEHICLE

CROSS-REFERENCE TO RELATED APPLICATION

This application is a continuation-in-part application of Ser. No. 335,501, filed 7 Nov., 1994 for WHEELCHAIR LIFT APPARATUS by Russell J. Dorn and assigned to the assignee of the present invention.

BACKGROUND AND FIELD OF INVENTION

This invention relates to retractable lifting devices; and more particularly relates to a novel and improved retractable wheelchair lift mechanism for the mobility-impaired and which can be installed in a storage compartment of a commercial vehicle.

Numerous approaches have been taken to wheelchair lift mechanisms to be incorporated into commercial vehicles in order to assist mobility-impaired persons in their ingress and egress to and from such vehicles. Typically, such mechanisms have included a movable platform which can be folded into a compact storage position along one side of the doorway or other accessway, then unfolded into an extended position and advanced to and from the ground or street level and the floor level of the vehicle. One representative apparatus of the type described is U.S. Pat. No. 5,149,246 for WHEELCHAIR LIFT APPARATUS FOR COMMERCIAL VEHICLES and assigned to the assignee of this invention.

In commercial buses, it is advantageous to be able to mount the platform assembly in a separate compartment, such as, the luggage bay or engine compartment beneath the doorway or other accessway so as not to interfere with the normal intended use of the doorway for pedestrian traffic other than for the mobility-impaired. However, when needed to assist the mobility-impaired, the lift mechanism can be rapidly and efficiently extended into an operative position for lifting or lowering such persons to and from ground level. Attempts have been made to provide wheelchair lift mechanisms of the type described but to my knowledge no one has successfully devised a platform assembly which can be efficiently stored beneath the doorway of a commercial bus within a limited space and which enables the use of existing reinforcement members within the vehicle as the sole means of support for the lift mechanism.

Other representative lift mechanisms of the type are disclosed in U.S. Pat. Nos. 4,022,317 to J. Eichenhofer et al, 4,081,091 to G. R. Thorley, 4,164,292 to L. F. Karkau, 4,456,128 to G. R. Thorley et al, 4,180,366 to C. W. Roth et al, 4,685,858 to D. Manning et al, 4,958,979 to I. Svensson, 5,224,723 to P. J. Hatas, 5,316,432 to R. L. Smalley et al and 5,375,962 to D. Kempf.

SUMMARY OF THE INVENTION

It is therefore an object of the present invention to provide for a novel and improved retractable lift mechanism for the mobility-impaired which is adapted to be stored within a limited space beneath a doorway or other accessway and can be deployed to an extended operational position externally of the doorway or accessway.

Another object of the present invention is to provide for a novel and improved wheelchair lift apparatus that can be remotely operated between a storage and deployed position and, in the deployed position, operated between a lowered position beneath the doorway, a raised position level with a floor inside of the doorway, and a storage position in a reliable and efficient manner.

It is a further object of the present invention to provide for a novel and improved wheelchair lift apparatus specifically adaptable for use with commercial vehicles, such as, buses and which can be efficiently mounted within a limited space beneath the doorway or accessway into the bus; and further wherein the apparatus is capable of being remotely controlled to be advanced between a retracted position within the vehicle and a deployed position which will clear the side wall of the vehicle as well as being lifted or lowered under the control of an operator.

In accordance with the present invention, a retractable lift apparatus is specifically adaptable for use with a vehicle of the type in which a storage compartment is disposed beneath a doorway leading into the interior of the vehicle and the apparatus comprises a fixed frame, a movable frame, a retractable control mechanism between the fixed and movable frames for selectively advancing the movable frame between a retracted position within the storage compartment and an extended position in which the movable frame is disposed beyond an exterior wall surface of the vehicle, a platform assembly on the movable frame, and lift means for lifting and lowering the platform assembly between a lower ground level position and upper raised position aligned with the doorway. The platform assembly itself may be of a conventional type which is manually foldable between an upright position against the movable frame and unfoldable to an extended horizontal position away from the movable frame in a direction externally of the vehicle when the movable frame is disposed beyond the exterior wall surface of the vehicle. Further, the fixed frame is such that it can be permanently fixed to existing support structure within the storage compartment and the entire apparatus occupy a minimum of space within the compartment. For the purpose of illustration, the storage compartment either may be a luggage bay or engine compartment beneath the passage or area of the vehicle.

The above and other objects of the present invention will become more readily appreciated and understood from a consideration of the following detailed description of preferred and modified forms of the present invention when taken together with the accompanying drawings in which:

DETAILED DESCRIPTION OF PREFERRED EMBODIMENT

Figure 1:
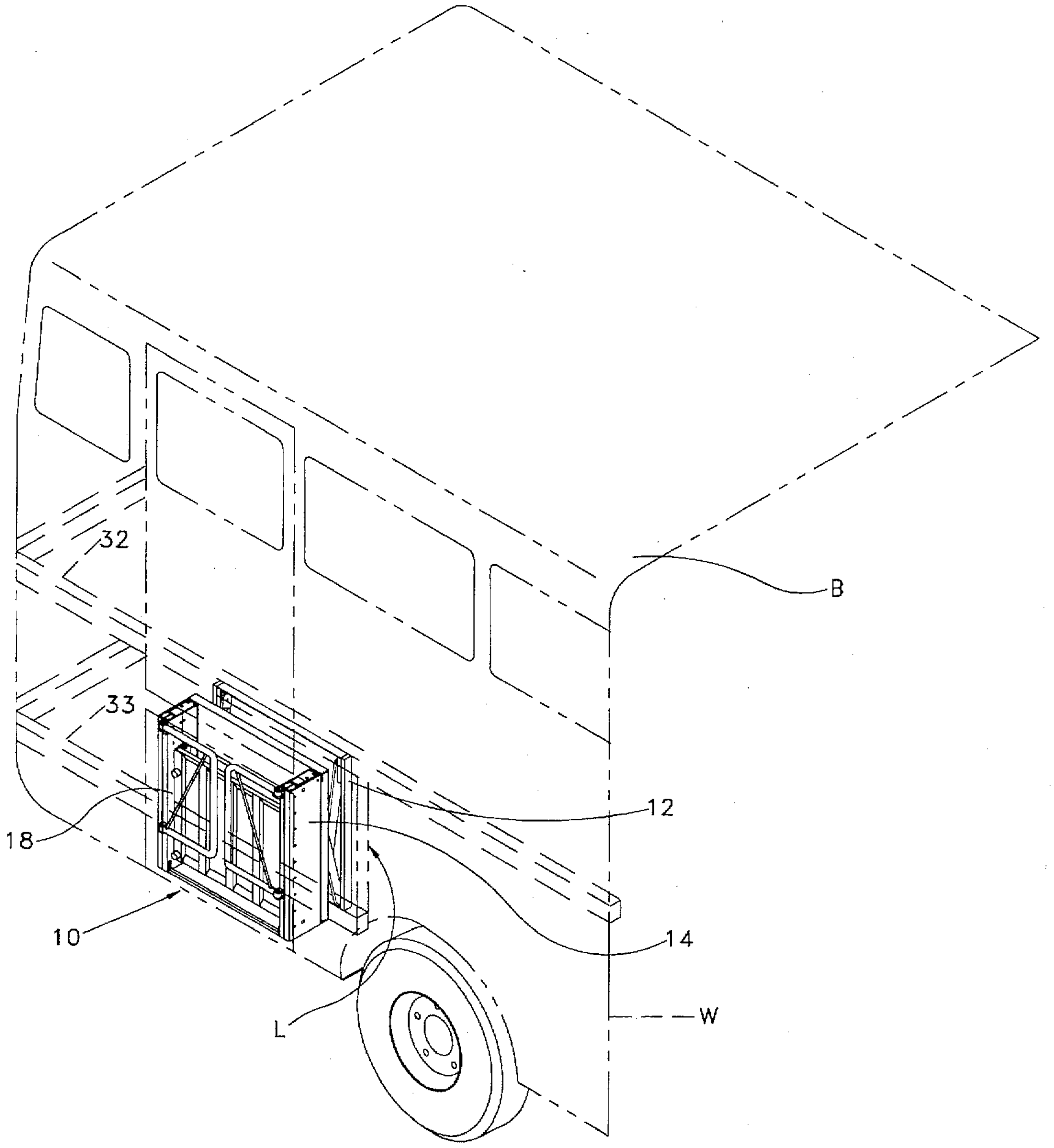
FIG. 1 is a somewhat fragmentary, perspective view of a commercial bus illustrating a preferred form of lift mechanism in a folded storage position in a luggage compartment of the bus.
Figure 2:
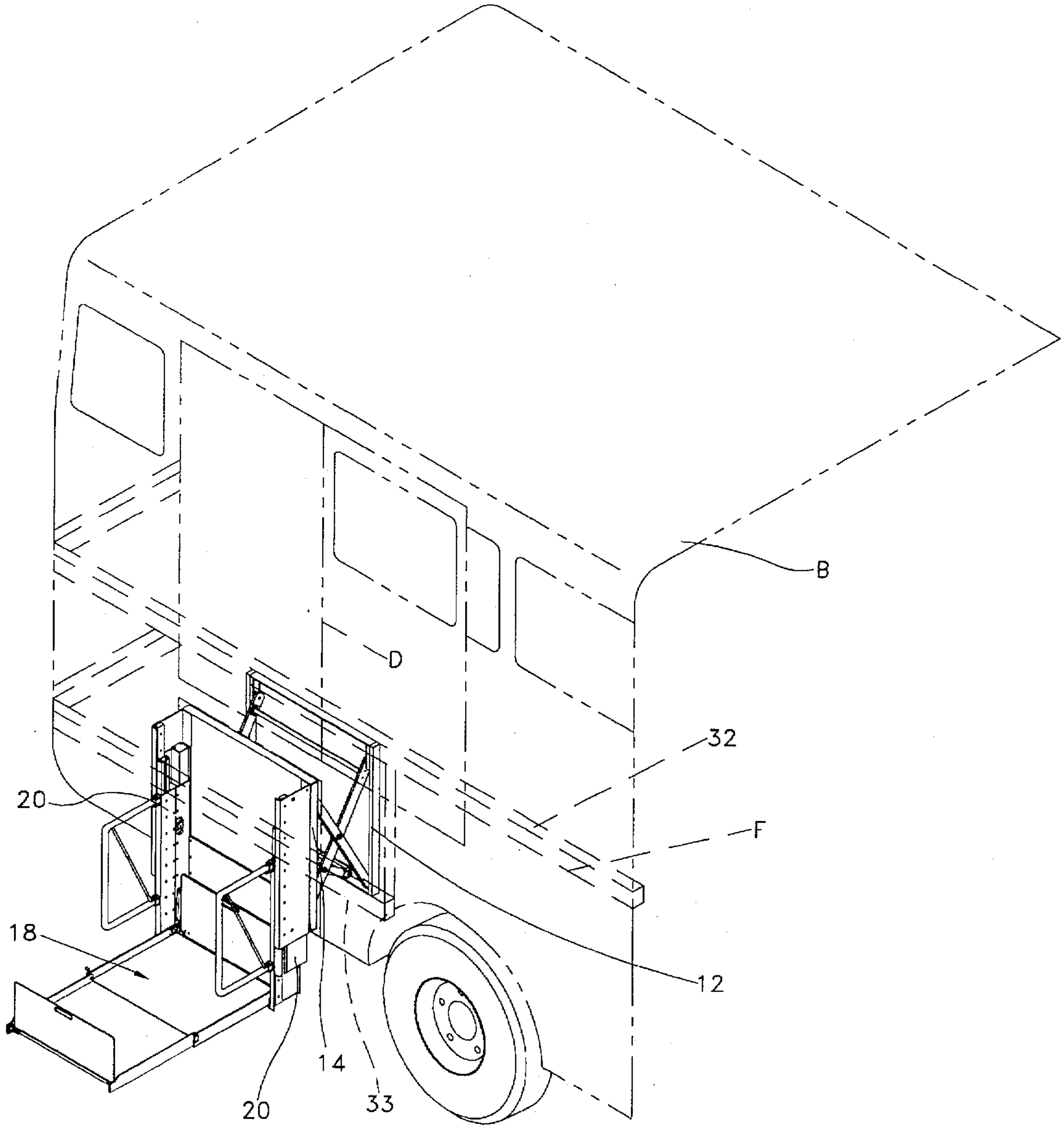
FIG. 2 is a perspective view illustrating the lift mechanism of the present invention in an extended position with its platform assembly at ground or street level.

Referring in more detail to the drawings, FIGS. 1 and 2 illustrate a preferred form of retractable wheelchair lift mechanism or apparatus 10 installed in a luggage bay L of a commercial bus B. The bus B is representative of various commercial buses having a luggage bay or other compartment located beneath a doorway D which affords access into the interior of the bus B and is provided as a setting for the present invention. However, it is to be understood that the mechanism 10 of the present invention is readily conformable for use in numerous applications which require installation of the lift mechanism away from the doorway and for example could have useful application in railway cars, vans and recreational vehicles as well as numerous non-vehicular applications.

Figure 3:
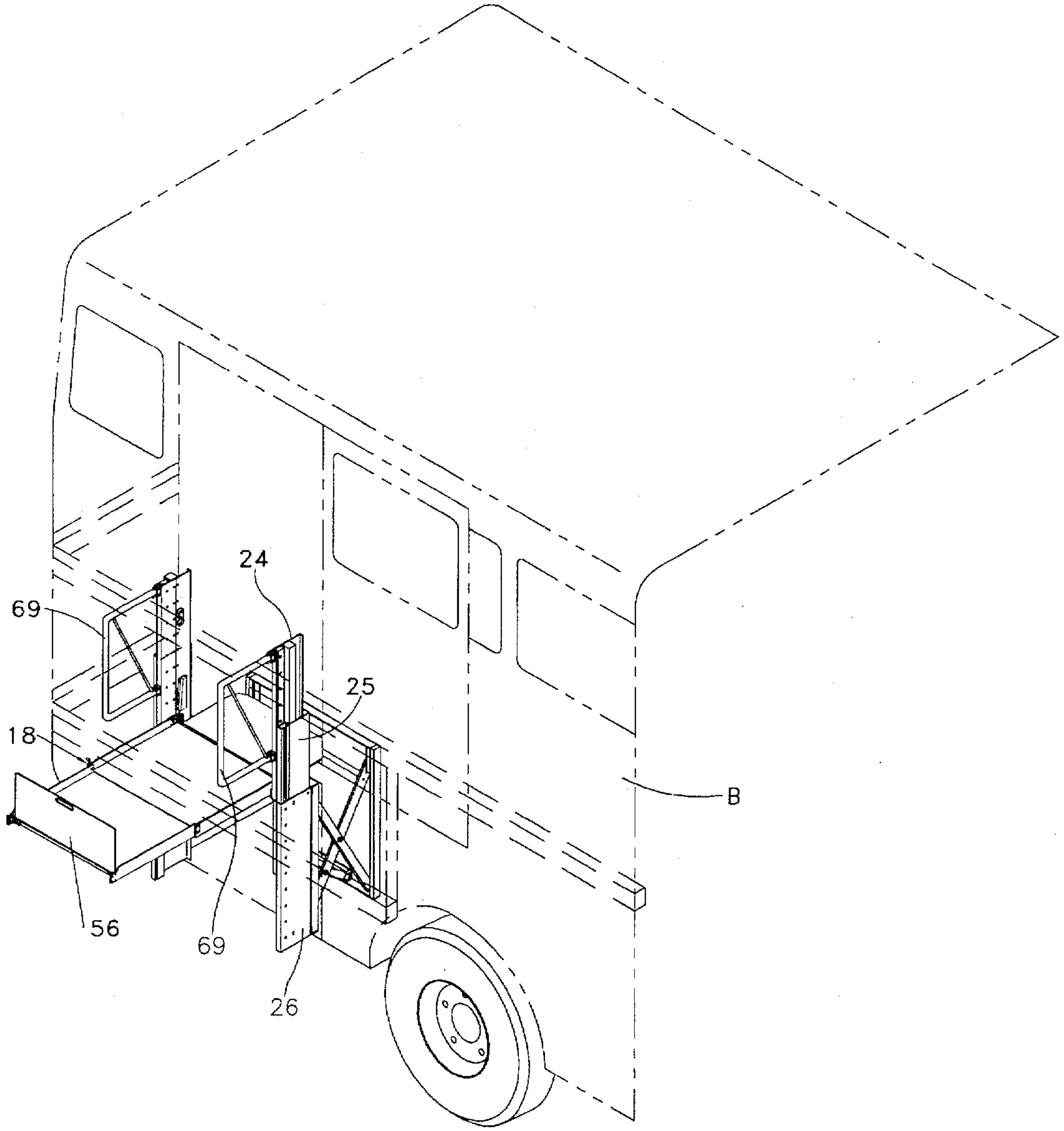
FIG. 3 is another perspective view of the lift mechanism similar to FIG. 2 but in the raised position with its platform assembly at the floor level of the vehicle.
Figure 5:
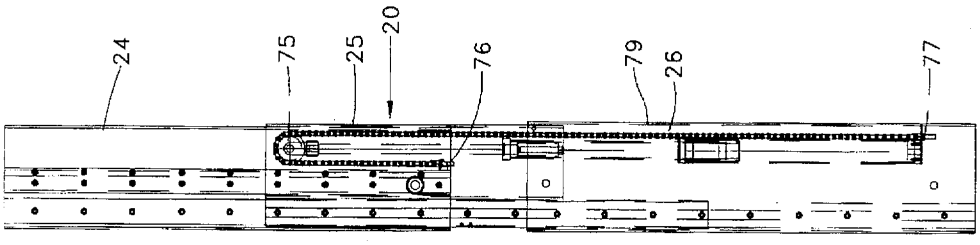
FIG. 5 is a front view in elevation of one of the slide channels for lifting and lowering the platform assembly.
Figure 4:
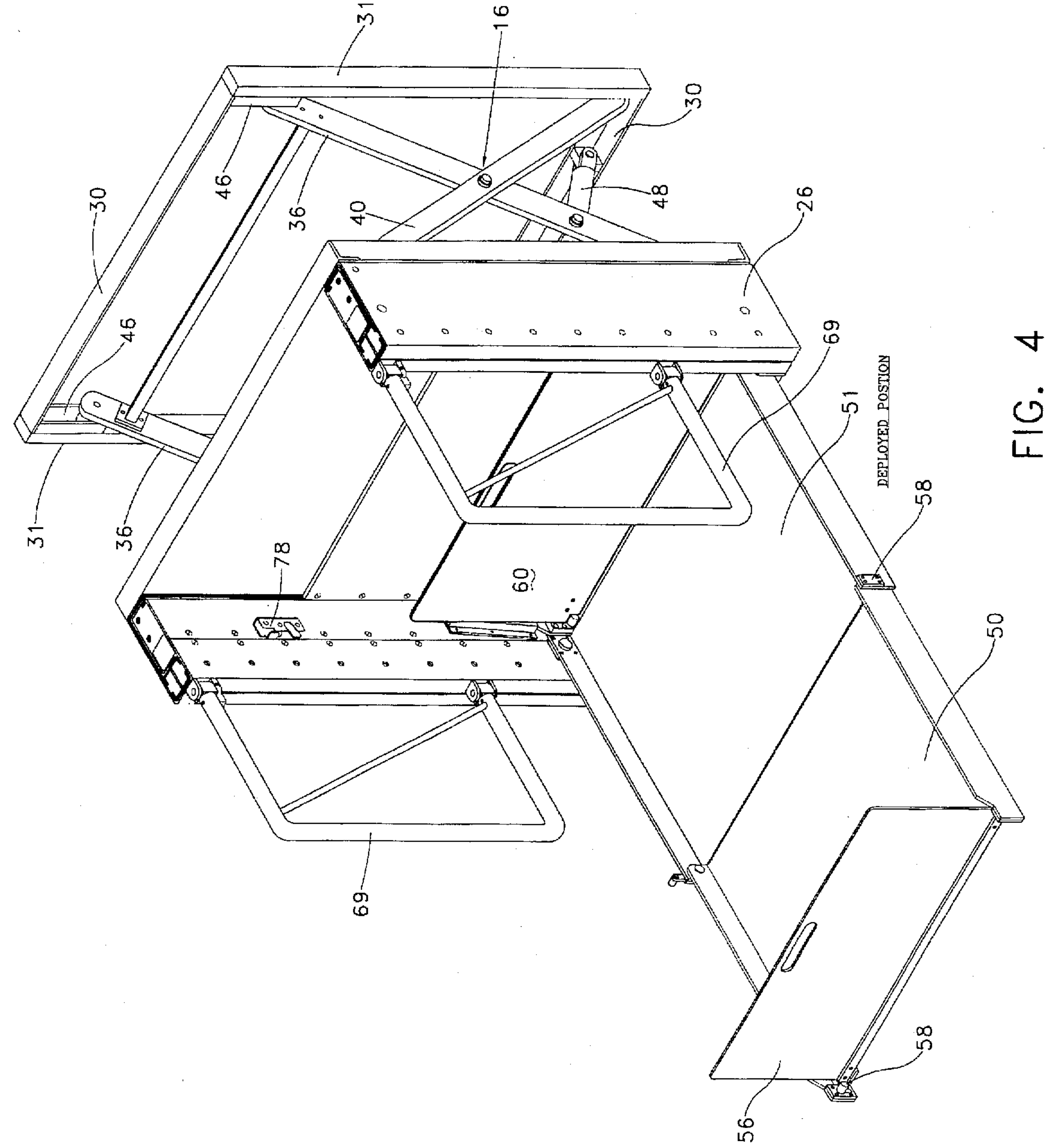
FIG. 4 is an enlarged perspective view illustrating the preferred form of lift mechanism in more detail.

As shown in FIGS. 1 to 3, the mechanism 10 is broadly comprised of a fixed frame 12, a movable frame 14, a retractable control mechanism 16 between the fixed or rear frame 12 and movable or front frame 14 for selectively advancing the movable frame between a retracted position within the luggage bay L, as shown in FIG. 1, and an extended position, as shown in FIG. 2, in which the movable frame 14 is disposed beyond an exterior wall W of the bus B. A conventional platform assembly 18 is mounted on the movable frame 14 for movement independently of the movable frame 14 between a folded, upright position against the movable frame, as shown in FIG. 1, and an extended horizontal position directed away from the movable frame 14, as shown in FIG. 2; and the platform assembly 18 is suspended on the movable frame 14 by a pair of lift units 20 on opposite sides of the platform assembly 18 which extend forwardly from the movable frame. As shown in FIGS. 4 and 5, each lift unit 20 includes an inner mast or slide member 24 movable in a vertical direction along intermediate channels 25 which in turn are slidable with respect to fixed outer masts 26. The masts 26 are fixed to opposite side edges of the movable frame 14 to form a guideway along one surface of the movable frame 14 opposite to the retractable control mechanism 16, and each inner mast 24 and channel 25 houses a telescoping drive mechanism for advancement of a respective mast 24 between a lowered position in which the platform assembly 18 is disposed at ground or street level, shown in FIG. 2, and a raised position in which the platform assembly is aligned with the floor level F of the interior of the bus, shown in FIG. 3.

Figure 7:
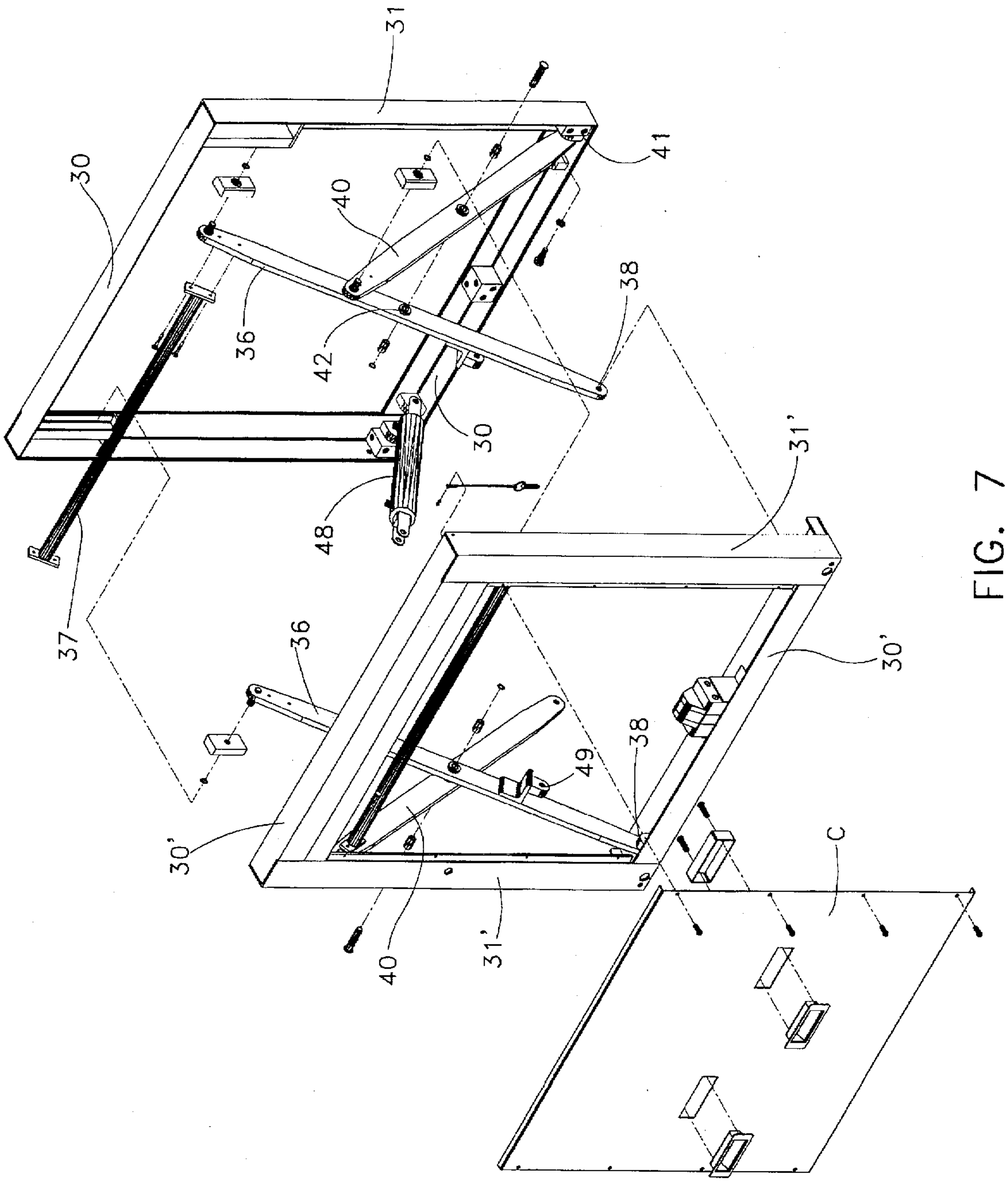
FIG. 7 is another exploded view of the retractable control mechanism for the movable and fixed frames of the preferred form of present invention.

In the preferred form, the fixed or rear frame 12 is of open, generally rectangular configuration having top and bottom angles 30 and opposite side angles 31, the top and bottom angles 30 being anchored to a bulkhead within the luggage bay or storage compartment L and the bulkhead consisting of upper and lower reinforcement members 32 and 33 to which the angles 30 are affixed by suitable fasteners so that the frame 12 is disposed in an upright position within the luggage bay L. The movable frame 14 corresponds to the size and configuration of the fixed frame and includes top and bottom angles 30' and opposite side angles or frame members 31'. As best seen from FIGS. 4 and 7, the retraction control mechanism 16 for the movable frame 14 comprises a scissors bracket assembly including extension arms 36 inclining forwardly and downwardly from pivotal connection to opposite ends of a rear bracket 37 and pivotally connected at their lower ends 38 to bottom corners of the movable frame 14. A second pair of extension arms 40 extend forwardly and upwardly from pivotal connection to pivot mounts 41 at lower corners of the rear frame 12, are pivotally connected as at 42 to the extension arms 38 and at their upper ends to a front bracket 44. The front and rear brackets 37 and 44 are correspondingly slidable in vertical guide tracks 46 at upper ends of the frames 12 and 14, and a pair of drive cylinders 48 are pivotally connected to the bottom angle 30 of the fixed frame for upward and forward extension into pivotal connection with pivot mounts 49 on each of the extension arms 36. When the cylinders 48 are activated to cause forward extension of their respective cylinder rods 48' through the cylinder housing, the pivotal extension arms 36 and 40 will be free to undergo pivotal movement about their common pivots 42 as the rear bracket 37 slides downwardly through the guide tracks 46 and the front bracket 44 correspondingly slides downwardly through the guide tracks, not shown, at the top corners of the movable frame 14 thereby causing forward extension of the movable frame 14 away from the fixed frame 12 into a deployed position externally of the vehicle, as illustrated in FIGS. 2 and 3. Conversely, when the cylinder rods are retracted through their respective cylinder housings the movable frame 14 will be retracted rearwardly into a stowed position in close proximity to the fixed frame as the front and rear brackets 44 and 37, respectively, slide upwardly through their respective guide tracks 46, as shown in FIG. 1.

Figure 6:
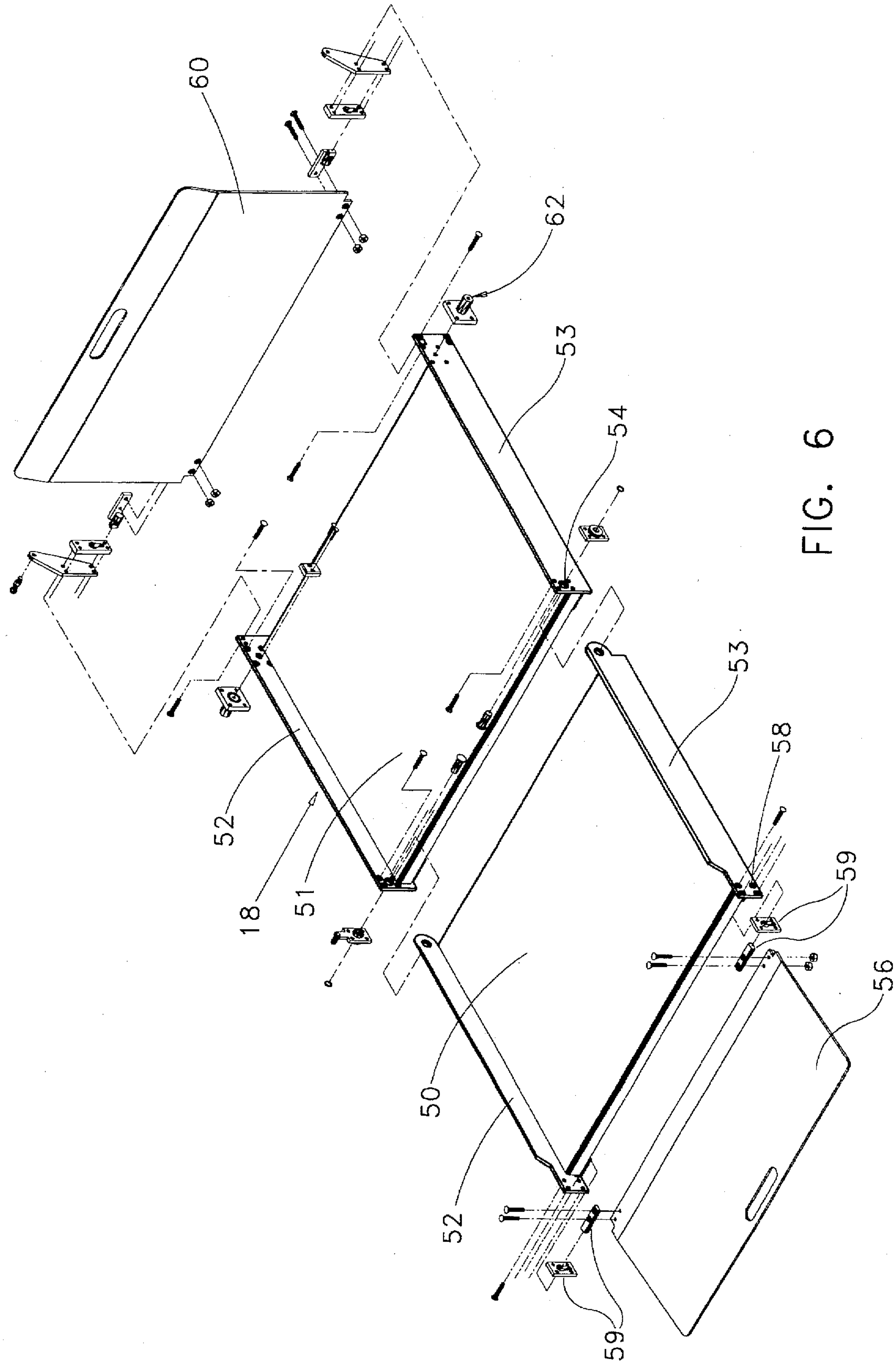
FIG. 6 is an exploded view of a platform assembly forming a part of the lift mechanism shown in FIGS. 1 to 5.

As shown in more detail in FIG. 6, the platform assembly 18 is of conventional construction and may be suitably comprised of front and rear rectangular panels or platform sections 50 and 51, each having raised side walls 52 and 53, respectively, which are hinged together as at 54 so that the front panel 50 may be folded over and into substantially flush relation to the rear panel 51. An outer barrier 56 in the form of a generally rectangular panel is hinged as at 58 to the front edge of the front panel 50 for movement between a horizontal position as illustrated in FIG. 6 and a vertical position as illustrated in FIG. 2, the pivot including restraint elements 59 to releasably lock the outer barrier 56 in the vertical position. Correspondingly, a rear barrier 60 in the form of a flat generally rectangular panel is hinged as at 62 to a rear edge of the panel 51 and is correspondingly movable between a horizontal position and a vertical position as illustrated in FIGS. 2 and 3. A limit switch 57 on the outer barrier 56 senses when the barrier 56 is in the vertical restraint position. In a manner to be described, only when the barrier 56 is in the vertical restraint position is the hydraulic drive system operable to lift the platform assembly 18. The inner barrier 60 is freely movable between the vertical and horizontal positions and simply swings out to floor level when the platform assembly 18 reaches the elevated position to be described. Again, the platform assembly 18 is merely representative of various platform assemblies that can be deployed in association with the movable frame 14 and is given more for the purpose of illustration and not limitation of a platform system which is extremely compact and simple to operate.

Referring once again to the lift units 20, as illustrated in FIGS. 3, 4 and 5, each inner mast 24 and channel 25 is made up of juxtaposed panel sections 64 and 65, a common tubular support 66 therebetween, and a slide bearing assembly 68 is interposed between the panel sections 64 and 65. The mast 24 and channel pairs undergo smooth gliding vertical movement along the outer mast 26 under the control of a hydraulic cylinder 70 which multiplies the travel of each inner mast 24 with respect to its outer mast 26 via chain drive 74 mounted over pulley 75 at the upper end of the channel 25. One end 77 of the chain is adjustably attached to the stationary outer mast 26 and opposite end 76 is attached to the inner channel 24 to multiply the travel of the cylinder by a ratio of 2:1 in advancing the platform assembly 18 between a lowered position at ground level and a raised position aligned with the floor of the bus.

Figure 8:
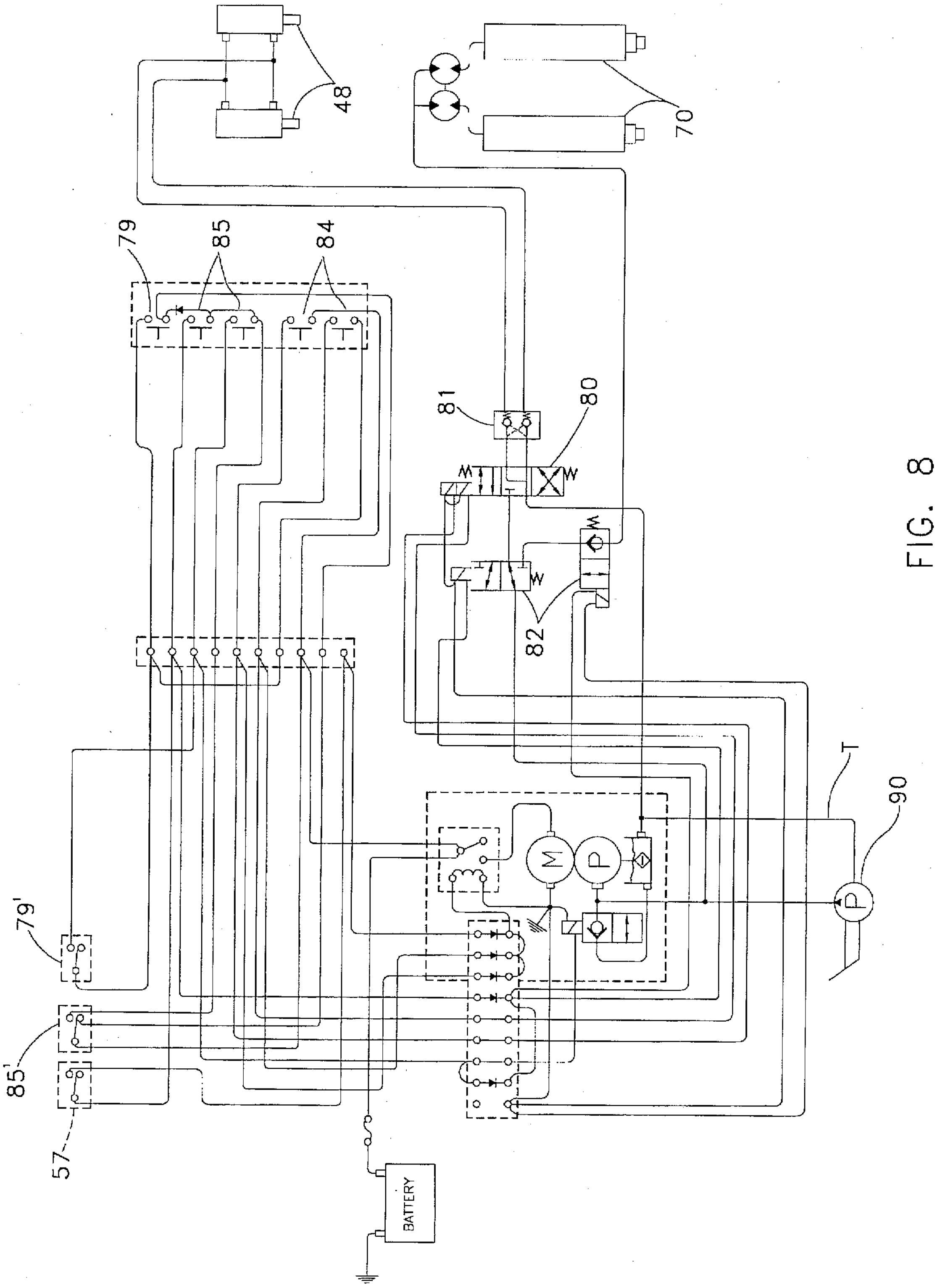
FIG. 8 is a schematic view of the electrical and hydraulic control system of the present invention.

Referring to FIG. 8, the vehicle operator is capable of controlling the movable frame 14 and associated platform assembly 18 between a retracted storage position within the luggage bay L and an extended position which permits the platform assembly to clear the outside wall of the vehicle by closing a control switch 84 to activate a constant speed, motor driven pump P. The pump P will then deliver fluid under pressure via flow control valve 80 to the cylinders 48 to activate the retractable control mechanism 16 and to cause forward extension of the movable frame 14 as described. At their outer end limit of movement, the cylinders 48 are locked in position by a locking valve 81. The operator or an assistant may then manually unfold the platform assembly from the position illustrated in FIG. 1 to a horizontal extended position as illustrated in FIG. 2. The platform assembly will be at the ground level position and, after the wheelchair has been rolled onto the front and rear platform sections 50 and 51, the outer barrier 56 is pivoted to the raised position and locked in place by the vertical restraint elements 59 in a well-known manner. The raised or vertical position of the outer barrier is sensed by the limit switch 57 to close the electrical control circuit between a raise/lower switch 85 and a control valve 82 which controls the lift cylinders 70. In addition, a raise/lower disable switch 85' will be closed when the platform assembly 18 and movable frame 14 are fully extended away from the fixed frame 12. Accordingly, the platform assembly cannot be raised until the outer barrier 56 has been advanced to its vertical restraint position and the disable switch 85' is closed. When the control valve 82 is activated by the raise/lower switch 85, the lift cylinders 70 are operative to raise the platform assembly to a position horizontally aligned with the interior floor level F of the bus, and the inner barrier 60 is then free to pivot into a horizontal position in overlapping relation to the floor F so that the wheelchair can be advanced into the interior of the bus.

In order to return the platform assembly 18 to its stowed position, the control valve 82 is shifted by closing of the switch 85 to retract the cylinder rods of the cylinders 70 and lower the platform assembly 18 to a level approximately one foot above the stow level. At that point a stow button 79 is depressed to continue to lower the platform assembly until the limit switch 79' engages a recessed portion in the mast causing it to open and cut the power to the stow button 79 thereby stopping the lift at the proper height. If the stow button does not automatically stop the platform flush with the storage compartment, adjustment can be made by lowering the lift unit until the end 77 of each chain is exposed whereupon an adjustment bolt on the end of the chain can be adjusted up or down until the flush portion is reached. The outer barrier 56 is then returned to its horizontal position and folded together with the front and rear platform sections 50 and 51 into engagement with latch mechanism 78 on the inner channels 24 so as to be retained in the storage position against the movable frame 14. The stow button 79 and retract button 84 are depressed simultaneously to retract the platform assembly 18 fully into the luggage bay, as illustrated in FIG. 1, the valve 80 being shifted to drain fluid from the cylinders 48 into tank T.

A hand pump 90 is provided for emergency situations in the event that the pump P should accidentally be disabled or inoperative and in the same manner can be employed to control the extension and retraction cylinders 48 as well as the lift cylinders 70. It will be appreciated that the switch buttons 79, 84 and 85 all may be mounted on a common hand-held control, and when the apparatus is in its stowed position within the luggage bay will be covered by a compartment door as represented at C in FIG. 6. Thus, by opening the compartment door C and using the hand-held control, the switch 84 is depressed until the movable frame 14 is in the full out position as described. Otherwise, if not completely extended, the raise and lower switch 85 will not function as previously described. Once out of the compartment, handrails 69 are unfolded on the platform assembly to a locked-open position, the platform is released from its stowed position by releasing the latch mechanism 78 and lowering the platform assembly to its deployed position, shown in FIG. 3. With the outer barrier 56 and inner barrier 60 in their vertical locked positions, after a wheelchair and/or a mobility impaired person has been placed on the platform, the raise/lower switch 85 is depressed to raise the platform to the floor level of the bus. When loading or unloading into or from the bus, the front barrier 56 should always be raised and locked. The rear barrier 60 can be lowered to allow loading or unloading then raised to the locked position.

In order to stow the apparatus, the platform assembly 18 is folded by lowering the inner barrier 60 onto the platform section 51 and the outer barrier onto the platform section 50, followed by folding the front portion of the platform over and down onto the rear or inner section then folding into the latched position. The handrails 69 are unlocked and folded into the locked position shown in FIG. 1. In order to stow the platform assembly, the lift mechanism must be above stow height. To this end, the switch member 85 is depressed to lower the lift unit to the proper stow height, the extend/retract control switch 84 is depressed to retract the platform assembly into the compartment, and the compartment door C is closed. If it is desired to return the platform assembly 18 to the stowed position from a down position, for example, as shown in FIG. 2, it must be raised to a position approximately one foot above the stow level before depressing the stow control button 79.

It is to be understood from the foregoing description that a preferred form of retractable wheelchair lift mechanism is set forth therein. Various modifications and changes may be made in the construction and arrangement of parts as well as specific applications to different vehicles without departing from the spirit and scope of the present invention as defined by the appended claims and reasonable equivalents thereof.

I claim:

1. Retractable lift apparatus for a vehicle wherein a storage compartment is disposed adjacent to a doorway leading into the interior of said vehicle, said apparatus comprising:

a fixed frame within said storage compartment;

a movable frame;

a retractable control mechanism between said fixed frame and movable frame for selectively advancing said movable frame between a retracted position within said storage compartment and an extended position in which said movable frame is disposed beyond an exterior wall of said vehicle;

a platform assembly on said movable frame movable between a folded stored position against said movable frame and an extended position away from said movable frame in a direction externally of said vehicle; and lift means for lifting and lowering said platform assembly between a lower ground level position and an upper raised position aligned with said doorway.

2. Apparatus according to claim 1, wherein said retractable control mechanism includes pivotal link members extending between said fixed frame and said movable frame.

3. Apparatus according to claim 2, wherein said pivot link members extend diagonally between said fixed frame and said movable frame.

4. Apparatus according to claim 3, at least one end of each said pivot link member being mounted for vertical sliding movement with respect to one of said fixed and said movable frames.

5. Apparatus according to claim 4, wherein guide tracks guide the vertical sliding movement of said one end of each said pivot link.

6. Apparatus according to claim 1, wherein said lift means includes channels on opposite sides of said movable frame, and fluid-operated cylinders in each of said channels for lifting and lowering said platform assembly.

7. Apparatus according to claim 6, wherein travel multiplier means is associated with each of said cylinders to multiply the distance of travel of each said channel to the travel of its respective cylinder.

8. Apparatus according to claim 7, wherein said travel multiplier means is defined by a chain extending over a sprocket in each said channel to provide for a two-to-one ratio of travel of said channel to the travel of said cylinder.

9. Apparatus according to claim 1, wherein said platform assembly includes front and rear platform sections hinged together, said rear platform section being hinged to said movable frame, and an outer barrier in hinged relation to said front platform section.

10. Apparatus according to claim 9, wherein said outer barrier includes a stop for releasably retaining said outer barrier in a vertical position.

11. Apparatus according to claim 9, wherein an inner barrier is disposed in hinged relation to said rear platform section and is movable into flush relation to a floor surface of the interior of said vehicle in response to lifting of said platform assembly to the raised position.

12. A retractable lift mechanism for a vehicle wherein a luggage bay is disposed beneath a doorway leading into the interior of said vehicle, said apparatus comprising:

a fixed frame permanently affixed to an interior bulkhead within said luggage bay;

a movable frame disposed in spaced parallel relation to said fixed frame;

a retractable control mechanism between said fixed frame and movable frame for horizontally advancing said movable frame between a retracted position within said luggage bay and an extended position beyond an exterior wall of said vehicle;

a platform assembly on said movable frame including manually foldable platform sections movable between a folded upright position against said movable frame and an extended horizontal position away from said movable frame in a direction externally of said vehicle;

lift means for lifting and lowering said platform assembly between a lower ground level position and an upper raised position aligned with said doorway; and stow height control means for automatically advancing said platform assembly to a position aligned with said luggage bay.

13. Apparatus according to claim 12, wherein said retractable control mechanism includes pairs of pivotal link members extending diagonally between said fixed frame and said movable frame in spaced parallel relation to one another.

14. Apparatus according to claim 13, at least one end of each said pivot link being mounted in a guide track for vertical sliding movement with respect to one of said fixed and said movable frames.

15. Apparatus according to claim 12, wherein said lift means includes channels on opposite sides of said movable frame, and fluid-operated cylinders in each of said channels for lifting and lowering said platform assembly.

16. Apparatus according to claim 15, wherein said stow height control means includes a limit switch to interrupt said stow height control means when said platform assembly has reached a position level with a lower end of said luggage bay.

17. Apparatus according to claim 12, wherein said platform assembly includes front and rear platform sections hinged together, said rear platform section being hinged to said movable frame, and an outer barrier in hinged relation to said front platform section, said outer barrier including a stop for releasably retaining said outer barrier in a vertical position.

18. Apparatus according to claim 17, wherein an inner barrier is disposed in hinged relation to said rear platform section and is movable into flush relation to a floor surface of the interior of said vehicle in response to lifting of said platform assembly to the raised position.

19. A retractable lift apparatus for a vehicle wherein a luggage bay is disposed beneath a doorway leading into the interior of said vehicle, said apparatus comprising:

a fixed open rectangular frame permanently affixed to an interior bulkhead within said luggage bay;

a movable open rectangular frame disposed in spaced parallel relation to said fixed frame;

a retractable control mechanism including a pair of scissors links between said fixed frame and movable frame for selectively advancing said movable frame between a retracted position within said luggage bay and an extended position in which said movable frame is disposed at an entrance to said storage compartment;

a platform assembly on said movable frame including manually foldable platform sections movable between a folded upright position against said movable frame and an extended horizontal position away from said movable frame in a direction externally of said vehicle; and fluid-operated drive means including a pair of cylinders associated with said scissors links for control extending and retracting of said movable frame with respect to said fixed frame, and lift cylinders for lifting said platform assembly between a lower ground level position, an upper raised position aligned with said doorway and a stow height position aligned with said luggage bay.

20. A retractable lift apparatus according to claim 19, wherein said fluid-operated drive means includes a first motor-driven pump with control valves for controlling displacement of said cylinders, and a second manually operable pump to selectively control said cylinders in the event that said first pump is disabled.

* * * * *